US009744960B2

(12) United States Patent
Kodawara

(10) Patent No.: US 9,744,960 B2
(45) Date of Patent: Aug. 29, 2017

(54) CONTROL SYSTEM FOR A PLUG-IN HYBRID VEHICLE

(71) Applicant: Nissan Motor Co., Ltd., Yokohama-shi, Kanagawa (JP)

(72) Inventor: Tomoyuki Kodawara, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 74 days.

(21) Appl. No.: 14/787,891

(22) PCT Filed: Mar. 31, 2014

(86) PCT No.: PCT/JP2014/059462
§ 371 (c)(1),
(2) Date: Oct. 29, 2015

(87) PCT Pub. No.: WO2014/192406
PCT Pub. Date: Dec. 4, 2014

(65) Prior Publication Data
US 2016/0082946 A1    Mar. 24, 2016

(30) Foreign Application Priority Data

May 29, 2013    (JP) ................................. 2013-112743

(51) Int. Cl.
*B60W 10/06*    (2006.01)
*B60W 10/24*    (2006.01)
(Continued)

(52) U.S. Cl.
CPC .............. *B60W 10/06* (2013.01); *B60K 6/28* (2013.01); *B60K 6/48* (2013.01); *B60K 6/543* (2013.01);
(Continued)

(58) Field of Classification Search
CPC .............................. B60W 10/24; B60W 10/26
See application file for complete search history.

(56) References Cited

U.S. PATENT DOCUMENTS

2001/0042648 A1* 11/2001 Wakashiro ............. B60K 6/485
180/65.26
2011/0093150 A1* 4/2011 Yanagisawa .......... B60W 20/13
701/22

FOREIGN PATENT DOCUMENTS

JP      11-332012 A     11/1999
JP      2005-218285 A    8/2005
(Continued)

*Primary Examiner* — Jerrah Edwards
*Assistant Examiner* — Kelly D Williams
(74) *Attorney, Agent, or Firm* — Global IP Counselors, LLP

(57) ABSTRACT

A control system for a plug-in hybrid vehicle has a drive system having a starter motor, a transverse engine, and a motor/generator, and also has a power supply system having a high voltage battery; a capacitor; and a hybrid control module that controls charge and discharge of the capacitor. In the control system for an FF plug-in hybrid vehicle in which external charging of the high voltage battery is available, the hybrid control module starts the starter, performs a mode selection control and a charge/discharge control, maintains the capacitor voltage equal to or higher than a voltage that allows the starter to start-up when a CD mode is selected at the time of ignition ON, and maintains a capacitor voltage equal to or less than a voltage at which deterioration does not proceed at the time of ignition ON with the CS being selected.

10 Claims, 4 Drawing Sheets

(51) Int. Cl.
  *B60K 6/48*   (2007.10)
  *B60K 6/543*  (2007.10)
  *B60L 11/14*  (2006.01)
  *B60L 11/18*  (2006.01)
  *B60W 10/26*  (2006.01)
  *B60W 20/00*  (2016.01)
  *B60W 20/13*  (2016.01)
  *B60W 10/08*  (2006.01)
  *B60K 6/28*   (2007.10)

(52) U.S. Cl.
  CPC ............... *B60L 11/14* (2013.01); *B60L 11/18* (2013.01); *B60W 10/08* (2013.01); *B60W 10/24* (2013.01); *B60W 10/26* (2013.01); *B60W 20/00* (2013.01); *B60W 20/13* (2016.01); *B60W 2510/244* (2013.01); *B60W 2540/06* (2013.01); *B60W 2710/06* (2013.01); *B60W 2710/08* (2013.01); *B60W 2710/244* (2013.01); *B60Y 2400/114* (2013.01); *B60Y 2400/214* (2013.01); *Y02T 10/6221* (2013.01); *Y02T 90/14* (2013.01); *Y10S 903/93* (2013.01)

(56) References Cited

FOREIGN PATENT DOCUMENTS

| | | |
|---|---|---|
| JP | 2008-7003 A | 1/2008 |
| JP | 2008-141855 A | 6/2008 |
| JP | 2012-167627 A | 9/2012 |
| JP | 2013-35386 A | 2/2013 |
| JP | 2014-231290 A | 12/2014 |

\* cited by examiner

CONTROL SYSTEM FOR A PLUG-IN HYBRID VEHICLE

CROSS-REFERENCE TO RELATED APPLICATIONS

This application is a U.S. National stage application of International Application No. PCT/JP2014/059462, filed Mar. 31, 2014, which claims priority based on Japanese Patent Application No. 2013-112743, filed in the Japan Patent Office on May 29, 2013, the contents of each of which is hereby incorporated herein by reference.

BACKGROUND

Field of the Invention

The present invention relates to a control system for a plug-in hybrid vehicle with a starter motor having a capacitor as power supply in which charging of a high voltage or power battery is enabled by an external charge.

Background Information

Conventionally, a power storage device is known in which the voltage of the power storage device is controlled between a preset lower limit voltage and a preset holding or sustaining voltage when the vehicle is not in use while the storage device is configured to be fully charged when the vehicle recognizes the driver though a vehicle driver authentication mechanism (for example, see JP 2008-141855 A).

SUMMARY

However, in the conventional device, when the driver turns on an ignition switch after getting on the vehicle, the storage device will be fully charged based on the recognition of the driver. Thus, although an engine start-up using the starter motor is ensured when the ignition is turned on, the storage device is maintained in full charge state. Therefore, a problem arises that deterioration of the power storage device proceeds due to increase in the internal resistance of power storage device.

The present invention was made in consideration of the above problem and aims to provide a control system for a plug-in hybrid vehicle that can achieve suppression of progress of the deterioration of the capacitor when the ignition is ON, while ensuring the start-up operation using the starter initiated start-up.

In order to achieve the above object, the present invention has a starter motor, an engine, and a motor/generator in the driving system. As power supply system, a high voltage battery for a power supply of the motor/generator, a capacitor for a power supply of the starter motor, and a capacitor charge and discharge control unit for controlling charging and discharging of the capacitor are provided. In the control system for the plug-in hybrid vehicle in which external charging of the high voltage battery is possible, an engine start control unit that starts the engine by cranking for a starter start-up as well as a running mode selection control unit are provided.

The running mode selection control unit is configured to basically select, when a charge capacity of the high voltage battery is equal to or greater than a threshold, a CD mode for performing an EV running by consuming or depleting the power of the high voltage battery while selecting a CS mode for performing a HEV running to sustain the charge capacity of the high voltage battery.

The capacitor charge and discharge control unit is configured to maintain or sustain a capacitor voltage that is equal to or greater than a starter start-up permission voltage when the ignition is ON with the CD mode being selected. When the CS mode is under selection, a capacity voltage will be maintained equal to or less than a voltage at which deterioration does not proceed.

Therefore, when the ignition is ON, when the CD mode is selected by the capacitor charge and discharge control unit, a capacitor voltage equal to the starter start-up permission voltage or more is maintained, whereas, with the CS mode being selected, the capacitor voltage equal to or less than a deterioration free voltage is maintained. In other words, the engine start in the CD mode is basically performed by the starter start while the engine start in the CS mode is basically performed by a M/G start using the motor/generator. That is, during selection of CS mode, it is not necessary to elevate the capacitor voltage for preparation of the starter start. In addition, since the capacitor, when kept in full charged state, increases the internal resistance to thereby facilitate degradation. Thus, when not in use, it is recommendable for extending the life to set the voltage to a voltage or below at which deterioration will not progress. Therefore, as an index of the capacitor charging state, it is determined whether the CS running mode or the CD running mode is selected. When the CD mode is selected, then the voltage is maintained at and above the starter start-up permission voltage, while, when the CS mode is selected, a voltage or below will be maintained, at which deterioration will not progress.

Consequently, when the ignition is ON, while ensuring the starter start-up, it is possible to achieve to suppress deterioration of the capacitor.

BRIEF DESCRIPTION OF THE DRAWINGS

Referring now to the attached drawings which form a part of this original disclosure.

DETAILED DESCRIPTION OF THE EMBODIMENTS

Figure 1:
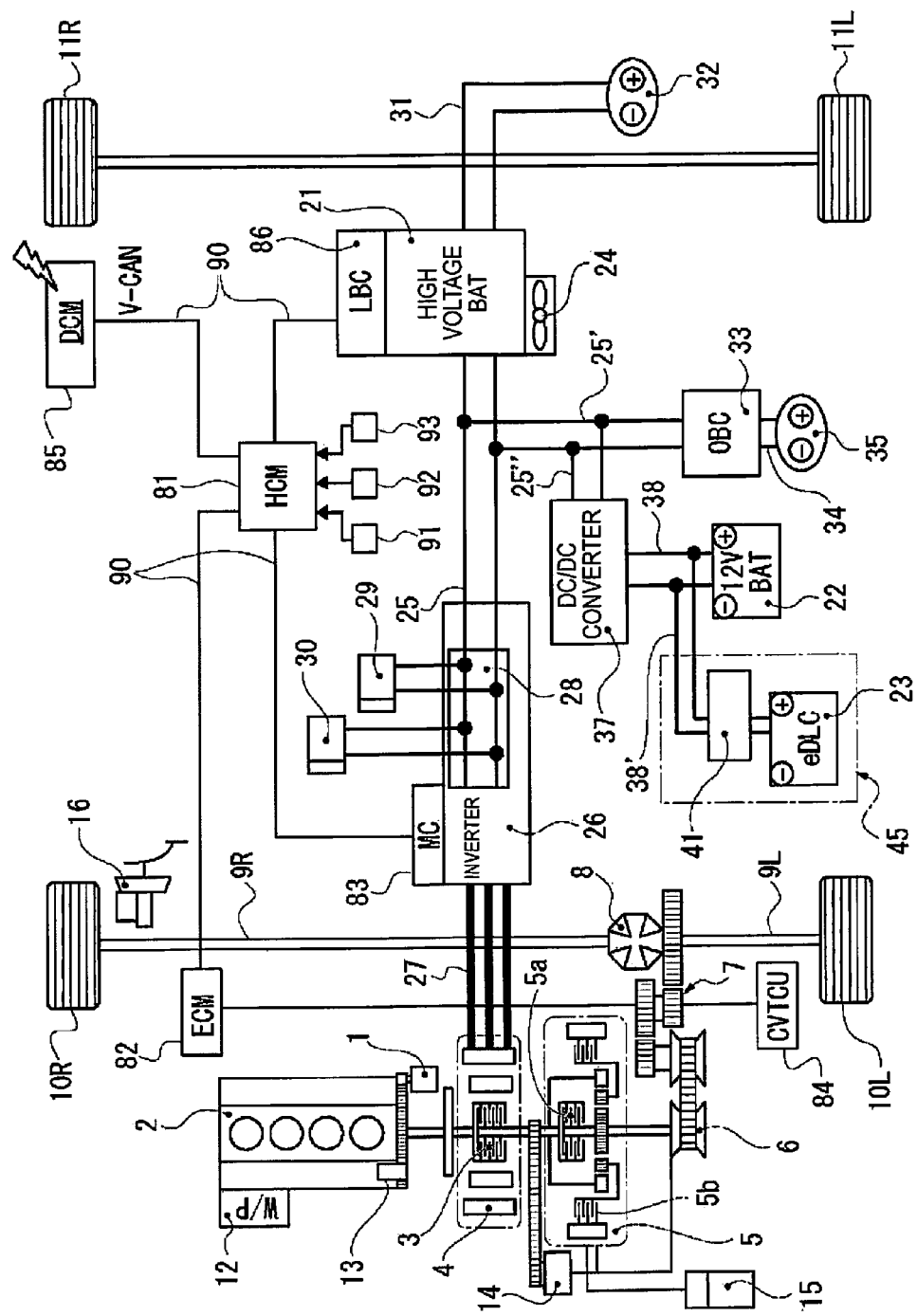
FIG. 1 is an overall system diagram showing an FF plug-in hybrid vehicle to which the control system of a first embodiment is applied.

Below, the best mode for implementing the control system of the plug-in hybrid vehicle according to the present invention will be described based on a first embodiment shown in the drawings.

First, a description is given of the configuration.

The configuration of the FF plug-in hybrid vehicle employing the control system of the first embodiment (an example of a plug-in hybrid vehicle) is described separately in a "Drive System Configuration", "Power Supply System Configuration", "Control System Configuration", and "Detailed Configuration of Capacitor Charge and Discharge Control".

Drive System Configuration

FIG. 1 is an overall system diagram showing an FF plug-in hybrid vehicle. Below, a description is given of a drive system configuration of the FF plug-in hybrid vehicle.

As shown in FIG. 1, as the drive system, a starter motor 1 (abbreviated as "M"), a transverse engine (abbreviated as "ICE"), a first clutch 3 (abbreviated as "CL1"), a motor/generator 4 (abbreviated as "M/G"), a second clutch 5 (abbreviated as "CL2"), and a belt-type continuously variable transmission (abbreviated as "CVT") are provided. An output axis of the belt-type CVT 6 is drivingly connected to left and right front wheels 10R, 10L via a final reduction gear train 7, a differential gear 8, and the left and right drive shafts 9R, 9L. Note that the left and right rear wheels 11R, 11L are configured as driven wheels.

The starter motor 1 has a gear meshing with an engine starting gear provided on the crankshaft of the engine 2 and is powered by a capacitor 23 to be described below and forms a cranking motor for driving or rotating the crankshaft when the engine is started.

The transverse engine 2 is an engine which is arranged in the front room with the crankshaft direction in the vehicle width direction, and has an electric water pump 12, a crank shaft rotation sensor 13 for detecting the reverse rotation of the engine 2 of the transverse engine 2.

The first clutch 3 is a hydraulic dry, multi-plate friction clutch interposed between the transverse engine 2 and the motor/generator 4, which is subject to selective control by a first clutch oil pressure to complete engagement/slip-engagement/release.

The motor/generator 4 is a permanent magnet synchronous motor of three-phase alternating current type connected to the transverse engine 2 via the first clutch 3. The motor/generator 4 is driven by a power supply of the high voltage battery 21 to be described below.

The starter coil of the motor/generator is connected via an AC harness to an inverter 26, which converts a direct current to a three-phase current during a driving operation while converting the three phase current to direct current during regeneration.

The second clutch 5 is a hydraulic wet-type multi-plate friction clutch interposed between the motor/generator 4 and the left and right front wheels representing driving wheels, and is subject to selective control by a second clutch hydraulic pressure to the full engagement/slip-engagement/release. The second clutch 5 makes use of a forward clutch 5a and a reverse brake 5b for a forward-reverse switching mechanism. That is, during forward traveling, the forward clutch 5a acts as the second clutch 5, while, during backward traveling, the reverse brake 5b serves as the second clutch 5.

The belt-type continuously variable transmission 6 is a transmission for obtaining a stepless or continuous speed change ratio by changing the winding diameter of the belt by shift hydraulic pressures to the primary fluid chamber and the secondary fluid chamber. The belt-type continuously variable transmission 6 is provided with a main oil pump 14 (mechanical drive), a sub oil pump 15 (motor driven), a control valve unit (not shown) that produces a first clutch hydraulic pressure and a shift hydraulic pressure using as a source pressure a line pressure that is obtained by pressure regulating the pump discharge pressure.

The first clutch 3, the motor/generator 4, and the second clutch 5 constitutes a one-motor-two-clutch drive system which operates as main drive modes according to the drive system in "EV mode", and "HEV mode". The "EV mode" represents an electric vehicle mode in which the motor/generator only is provided as the driving source with the first clutch 3 released and the second clutch engaged. Travelling in the "EV mode" is referred to as the "EV running". The "HEV mode" represents a hybrid vehicle mode in which the transverse engine 2 and the motor/generator 4 act as power source with both clutches 3, 5 engaged. Travelling in the "HEV mode" is referred to as "HEV running".

The motor/generator 4 is equipped with a regenerative cooperative brake unit 16 which controls the total braking torque during braking operation basically in response to a regenerative operation during braking operation, The regenerative cooperative brake unit 16 is provided with a brake pedal, an electric booster, and a master cylinder. The electric booster carries out a coordinated control of regenerative part/hydraulic part allocation such that, during braking operation, the amount that is obtained by subtracting from a required braking force represented by a brake pedal operation amount an available regenerating braking force will be borne by the hydraulic braking force.

Power Supply System Configuration

Figure 2:
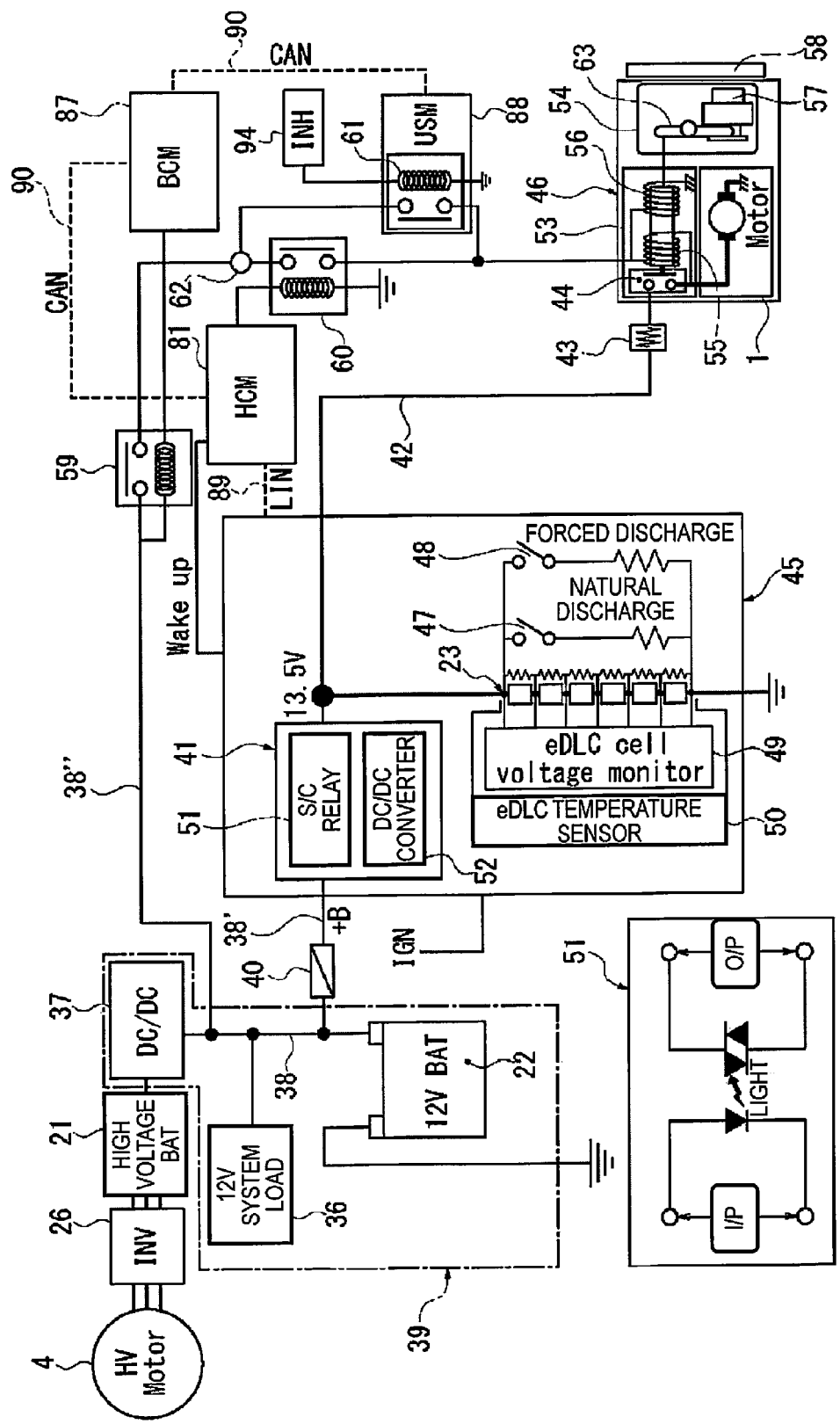
FIG. 2 is a power supply circuit diagram showing a power supply system arrangement with a focus on a starter power supply source of the FF plug-in hybrid vehicle to which the control system of the first embodiment is applied.

FIG. 1 is an overall system diagram showing an FF plug-in hybrid vehicle, and FIG. 2 is a power supply circuit diagram with focus on the starter power supply. Below, with reference to FIGS. 1 and 2, a description is given of the power supply system configuration for the FF plug-in hybrid vehicle.

As the power supply system, as shown in FIG. 1, a high voltage battery 21 as a motor/generator power, and a 12V battery 22 as a 12V system load power, and a capacitor 23 as a starter power supply, respectively.

The high voltage battery 21 is a rechargeable or secondary battery mounted as a power source of the motor/generator 4, and uses, for example, lithium ion battery. One or more of cell modules formed by laminating a plurality of cells is stored within a battery case. A junction box is accommodated in the high voltage battery 21, which aggregates relay circuits for supply/cutoff/distribution of high power. Further, a battery temperature adjustment unit 24 for air-conditioning function and lithium battery controller 86 for monitoring the battery charge capacity (battery state of charge; battery SOC) and the battery temperature are attached.

The high voltage battery 21 and the motor/generator 4 are connected through a DC harness 25, an inverter 26, and an AC harness 27. A junction box 28 which aggregates relay circuits of the supply/cutoff/distribution for high voltage is accommodated in the inverter 26. Further, the air-conditioning circuit 29, an electric air compressor 30, and a motor controller 83 to perform a power running/regenerative control are attached. In other words, the inverter 26 converts the direct current from the DC wiring harness into a three phase alternating current to the AC wiring harness 27 when the inverter 26 drives the motor/generator 4 due to discharge of the high voltage battery 21 during a driving mode. When the high voltage battery 21 is charged during a regenerative mode by power of the motor/generator 4, the three phase AC from the AC wiring harness 27 is converted into the direct current to the DC wiring harness 25.

In addition to a rapid external charging port 32 connected to the high voltage battery 21 through a DC harness 31, a normal external charging port 35 is connected to the high voltage battery 21 via a DC branch harness 25', a charger 33 and the AC harness 34. The charger 33 functions to a voltage conversion and AC/DC conversion, when rapid external charging, for example, external charging is performed by connecting a connector plug of a charging station installed in the road or the like to the rapid external charging port 32 (rapid external charging). During normal external charging, for example, a connector plug from the household power supply is connected to the normal external charging port 35 for external charging (normal external charging).

The 12V battery 22 is a rechargeable secondary battery mounted as a power source of 12V system load 36 representing the other auxiliary equipment except the starter motor 1. For example, a lead battery is used which is generally mounted in the engine vehicle. The high voltage battery 21 and the 12V battery 22 are connected via DC branch harness 25", a DC/DC converter 37, and a battery harness 38. The DC/DC converter 37 is intended to convert the several hundred volts voltage from the high voltage battery 21 to 12V. By controlling the DC/DC converter by the hybrid control module 81, the charge capacity of the 12V battery is configured to be managed.

The capacitor 23 is a storage device that is mounted as a dedicated power supply of the starter motor 1. A capacitor called as an electric double layer capacitor (eDLC: electric Double Layer Capacitor) is used, which has a large capacitance and excellent characteristics in quick charging and discharging performance. As shown in FIG. 2, the auxiliary load power supply system 39 and the capacitor 23 are connected via a battery branch harness 38' including a fuse 40 and a capacitor charging circuit 41. The capacitor 23 and the starter motor 1 are connected via a capacitor harness 42, a resistor 43 and a relay switch 44. In addition, a DLC unit 45 is formed by the capacitor 23 and the capacitor charging circuit 41 while a starter unit 46 is formed by the starter motor 1, the relay switch 44, and the like. Below, a description of the detailed configuration of the DLC unit 45 and the starter unit 46 is given.

As shown in FIG. 2, the DCL unit 45 includes the capacitor 23, a capacitor charging circuit 41, a self-discharge switch 47, a forced discharge switch 48, a cell voltage monitor 49 (the capacitor voltage detecting unit), and a capacitor temperature sensor 50.

The capacitor 23 is formed by connecting a plurality of DLC cells in series/parallel. The self-discharge switch 47, the forced discharge switch 48, and the capacitor temperature sensor 50 are disposed on both ends of the plurality of DLC cells in parallel. Further, the cell voltage monitor 49 is disposed parallel to each of DLC cells so as to detect a cell voltage (=capacitor capacity) of each cell of the plurality of DLC cells.

The capacitor charging circuit 41 is constituted by a DC/DC converter circuit integrating semiconductor switching relays (combination circuit of switching elements, choke coils, capacitors, and a diode). The capacitor charging circuit 41 includes a semiconductor relay 51 and a DC/DC converter 52 controlled by the hybrid control module 81. The semiconductor relay 51 is a non-contact relay with light semiconductor switching elements, for example, as shown schematically in the lower left portion in FIG. 2, called as a photo-coupler for transmitting optical signals in the space of the insulated input and output. The semiconductor relay 51 has a switching function to connect or disconnect the capacitor 23 to or from the auxiliary load power supply system 38. The DC/DC converter 52 is configured to subdivide a DC input into pulse current by the switching element and connect these to obtain the direct current output of required voltage. Thus the DC/DC converter includes the function of converting the 12V direct current to the 13.5 V direct current as well as switching the capacitor charge current.

The starter unit 46 includes a starter motor 1, a relay switch 44, an electromagnetic actuator 53, and a pinion shifting mechanism 54.

The electromagnetic actuator 53, by an electromagnetic force generated by energizing the two coils 55 and 56 causes the pinion 57 to a position meshing with the ring gear 58 in addition to turning the relay switch 44 on. When cutting off the current, in addition to turning off the relay switch 44, the pinion 57 will be shifted to a position released from meshing with the ring gear 58. Note that the ring gear 58 is mounted to a crankshaft of the transverse engine 2. The auxiliary load power supply system 39 and two coils 55, 56 are connected via a battery branch harness 38" including a starter cutoff relay 59, a HEV/IS/relay 60, and a starter relay 61. The energization/shut-off of the starter cutoff relay 59 is carried out by a body control module 87. The energization/shut-off the HEV/IS/relay 60 is made by the hybrid control module 81. The energization/shut-off of the starter relay 61 is made by an under-hood switching module 88. Note that, at a crossing position of the battery branch harness 38", a voltage sensor 62 for diagnosing the relay is provided.

The pinion shifting mechanism 54 is provided with a pinion 57 which is axially moveable relative to the motor shaft of the starter motor 1 and a shift lever connected at its one end to an electromagnetic actuator 53 and fitted at the other end into the shift groove of the pinion 57.

Control System Configuration

Figure 3:
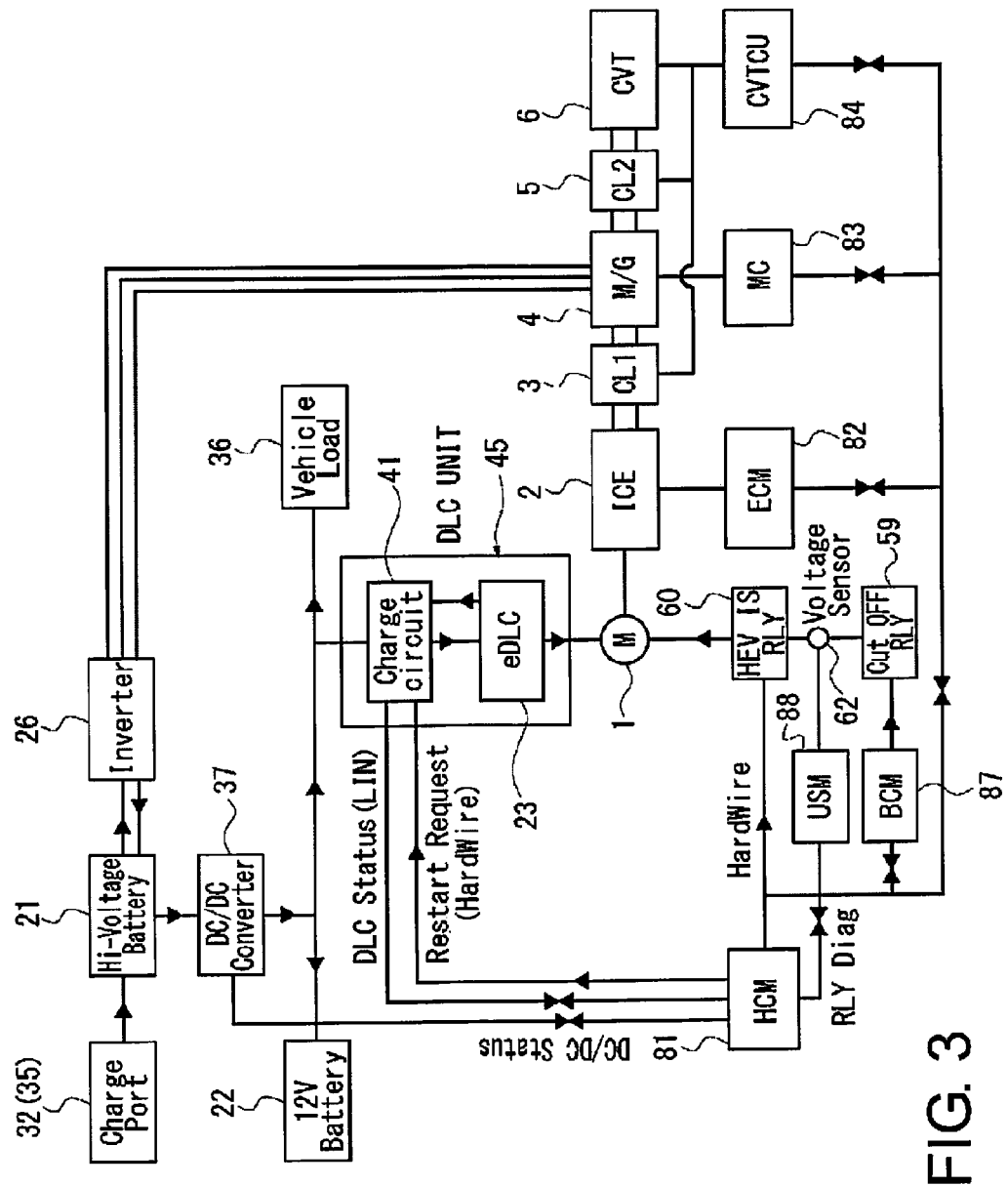
FIG. 3 is a block diagram showing a control system configuration of the FF plug-in hybrid vehicle to which the control system of the first embodiment is applied.

FIG. 1 shows the overall system of the FF plug-in hybrid vehicle. FIG. 2 shows the power system configuration around the starter power supply, FIG. 3 shows a control system configuration. Hereinafter, based on FIGS. 1 to 3, illustrating a control system configuration of the FF plug-in hybrid vehicle.

As shown in FIGS. 1 to 3, as the control system, the hybrid control module 81 (abbreviated as "HCM") is an integrated control unit that controls appropriately the energy consumed by the overall vehicle. An engine control module 82 (abbreviated as "ECM), the motor controller 83 (abbreviated as "MC"), a CVT control unit 84 (abbreviated as "CVTCU") are control units connected to the hybrid control module 81. Further, a data communication module 85 (abbreviated as "DCM"), a lithium battery controller 86 (abbreviated as "LBC") are provided. In addition, the body control module 87 (abbreviated as "BCM") and an under-hood switching module 88 (abbreviated as "USM") are provided. These control units are connected so as to be bi-directionally communicative through a CAN communication line 90 (CAN is an abbreviation of "Controller Area Network") except for a LIN communication line 89 (LIN: abbreviation for Local Interconnect Network) through which the hybrid control module 81 and the DCL unit 45 are connected each other.

The hybrid control module 81 executes various controls based on input information from each control unit, ignition switch 91, accelerator pedal opening sensor 92, a vehicle speed sensor and the like. Among them, the control that is intended to drive a FF plug-in hybrid vehicle for which an external charging is available at a high fuel consumption efficiency is referred to as the selection control of the running mode ("CD mode" and "CS mode") based on a battery SOC of the high voltage battery 21 (Running Mode Selection Control Unit).

During the "CD mode (Charge Depleting mode)", in principle, a priority is placed on an EV mode in which power of the high voltage battery is consumed, and the "CD mode" is selected during a period in which the battery SOC decreases from the full SOC to a predetermined SOC. However, in a high load running so that the driving force would be insufficient in EV running, the HEV running mode is performed exceptionally. Basically, the starting operation of the transverse engine 2 during the "CD mode" being selected, start by the starter motor 1 (starter start-up) is a basic operation. The start by the motor/generator 4 (M/G start) is thus held exceptional.

The "CS mode (Charge Sustain mode)" refers to a mode in which, in principle, a priority is placed on the HEV running to maintain the power of the high voltage battery 21, and is selected as the battery SOC of the high voltage battery 21 is below the preset SOC. That is, when the battery SOC of the high voltage battery 21 is required to be sustained or maintained in a predetermined range, the HEV running is carried out by an engine power to generate the motor/generator 4. Note that the predetermined mode switching threshold, i.e. the preset SOC is set such that between a value from the CD mode to the CS mode and a value from the CS mode to the CD mode a hysteresis is provided.

The hybrid control module 81, in addition to the selection control between the "CD mode" and "CS mode", performs an engine start-up control by the starter motor 1, a charging control to charge the capacitor 23, and the discharge control from the capacitor 23.

Also, starter related controls such as below will be carried out.
(A) Time reduction control from starting the engine until the starter start-up permission.
(B) Time reduction control from the ignition on until the starter start-up permission.
(C) Deterioration progress suppression control of the capacitor 23 (FIRST EMBODIMENT).
(D) High temperature/low temperature countermeasure control of the capacitor 23.
(E) Voltage sag prevention control of the vehicle auxiliary equipment.

The engine control module 82 performs a fuel injection control, an ignition control, a fuel-cut control, etc. of the transverse engine 2. The motor controller 83 performs a power driving control and regenerative control of the motor generator 4 by the inverter 26. The CVT control unit 84 performs an engagement pressure control of the first clutch 3, an engagement pressure control of the second clutch 5, a shifting hydraulic pressure control of the belt-type continuously variable transmission 6, etc. The data communication module 85, in response to remote operation of a switch of a portable remote control key and the communication being established between the portable remote control key, performs, for example, control of the locking/unlocking of a charge port lid and/or a connector locking mechanism. The lithium battery controller 86 manages a battery SOC and a battery temperature. The body control module 87 controls energization/de-energization of a starter cutoff relay 59. Finally, the under-hood switching module 87 performs energization/de-energization of a starter relay 61 incorporated therein based on a range select signal from an inhibitor switch 94.

Detailed Configuration of Capacitor Charge and Discharge Control

Figure 4:
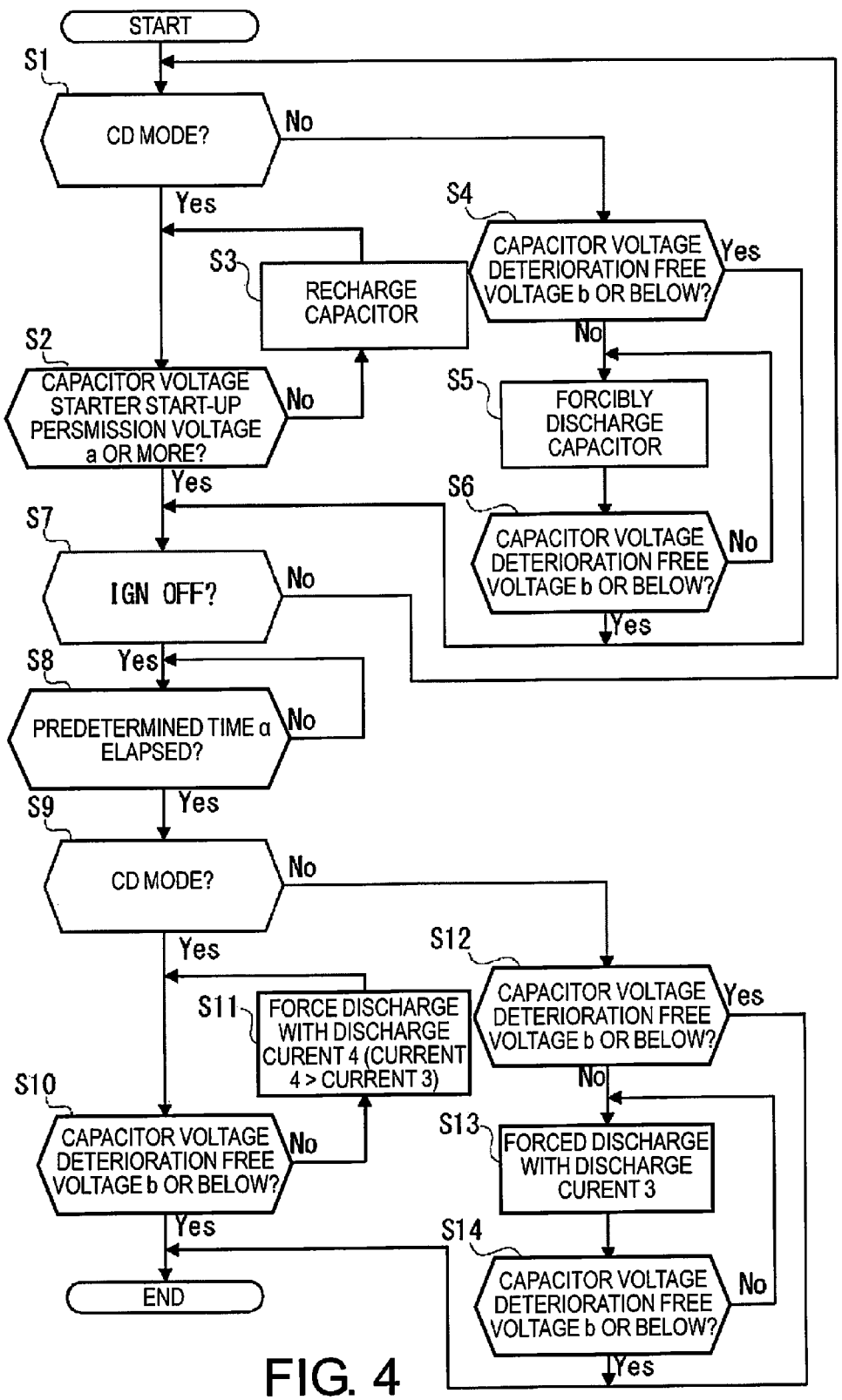
FIG. 4 is a flowchart showing a flow of a capacitor charge and discharge control process executed by a hybrid control module of the first embodiment.

FIG. 4 shows a capacitor charge and discharge control processing flow executed by the hybrid control module 81 (capacitor charge and discharge control unit). Below, a description is given of each step representing a capacitor charging and discharging control processing configuration.

In step S1, subsequent to a determination of control start, or, a determination in step S7 of ignition being turned on, during the time of ignition ON, it is determined whether or not a running mode being selected is the "CD mode". If Yes (CD mode being selected), control proceeds to step S2, while, if NO (CS mode being selected), control proceeds to step S4.

Here, the "CD mode" will be selected when a charge state of the high voltage battery is equal to a threshold value (SOC being about 20%, for example) or more while the "CS mode" will be selected when the charge state of the high voltage battery is less than the threshold value.

In step S2, subsequent to the determination in step S1 that the CD mode is selected, or, capacitor recharging in step S3, it is determined whether or not the capacitor voltage is equal to the starter start-up permission or enabling voltage or higher. If Yes (capacitor voltage≥starter start-up permission voltage a), control proceeds to step S7, while in the case of No (capacitor voltage<starter start-up permission or enabling voltage a), control proceeds to step S3.

Here, "the starter start-up permission or enabling voltage a", for example, when the capacitor 23 in a fully charged at the capacitor voltage of 13.5V in the first embodiment, the starter start-up permission or enabling voltage a is set to 12.5V at which the duration of the starter start-up falls within a target time.

In step S3, subsequent to the determination in step S2 that the capacitor voltage is less than the starter start-up permission voltage a, recharging of the capacitor 23 is performed and control returns to step S2.

For the recharging of the capacitor 23, as a charging current, normal current 1 (e.g., 15 A) is selected for applying to the capacitor 23, that may suppress capacitor degradation.

In step S4, subsequent to the determination in Step S1 that the CS mode is being selected, it is determined whether or not the capacitor voltage is equal to a voltage b at which degradation or deterioration would not proceed. If Yes (capacitor voltage≤voltage b), control proceeds to step S7, whereas, in the case of No (capacitor voltage>Voltage b), control proceeds to step S5.

Here, the "voltage b at which deterioration would not proceed or deterioration free voltage" is set to 6.0 V in the case of six cells connected in series, since it has been discovered that the degradation or deterioration would not proceed if per cell capacitor 23 is less than 1V.

In step S5, subsequent to the determination in step S4 or S6 that the capacitor voltage is higher than the voltage b, a switch for forced discharge of the capacitor 23 is closed to forcibly discharge the capacitor 23, and control proceeds to step S6. Here, the forced discharge of the capacitor is performed by the current 3 that is the normal discharge current.

In step S6, following the forced discharge of the capacitor in step S5, it is determined whether or not the capacitor voltage is equal to the deterioration free voltage b or less. If Yes (capacitor voltage≤voltage b), control proceeds to step S7, while, in the case of No (capacitor voltage>Voltage b), control returns to step S5. Here, as the "voltage b at which deterioration would not proceed", the same voltage value as the step S4 is used.

In step S7, subsequent to the determination in step S2 that the capacitor voltage≥starter start-up permission voltage a at the step S2, or, subsequent to the determination in step S4 or S6 that the capacitor voltage≤voltage b, it is determined whether or not the ignition switch 91 has been switched or turned from OFF to ON. If Yes (IGN OFF), control proceeds to step S8, while, if NO (IGN ON), control returns to step S1.

In step S8, subsequent to the determination of the IGN OFF in step S7, it is determined whether or not, after the ignition is turned off, a predetermined time period a has elapsed. If YES, the process proceeds to step S9, while, if NO (after IGN OFF, the predetermined time α has not yet elapsed), the process repeats the determination in step S8. Here, the "predetermined time α" is set to a standby time considering the case of switching the ignition on again from the ignition-off state due to the change-mind of the driver.

In step S9, subsequent to the determination that the predetermined timeα elapses after IGN OFF in step S8, it is determined whether or not the running mode being selected is the "CD mode". If Yes (CD mode being selected), the process proceeds to step S10. In the case of No (i.e., CS mode is being selected), the process proceeds to step S12.

In step S10, subsequent to the determination in step S9 that the CD mode is being selected, or, subsequent to the forced discharge at the discharge current 4 in step S11, it is determined whether or not the capacitor voltage is equal to the deterioration free voltage b (i.e. the voltage at which deterioration does not proceed) or less. If YES (capacitor voltage≤voltage b), the process proceeds to exit. If No (capacitor voltage>voltage b), control proceeds to step S11. Here, the "the deterioration free voltage b" is set to the same voltage value as the step S4.

In step S11, subsequent to the determination in step S10 of the capacitor voltage being greater than voltage b, the forced discharge switch 48 is closed to forcibly discharges the capacitor 23 with the current 4 higher than the current 3 that is the normal discharge current, and control goes back to step S10.

In step S12, subsequent to the determination in step S9 that the CS mode being selected, it is determined whether or not the capacitor voltage is equal to the deterioration free voltage b or less. If Yes (capacitor voltage≤voltage b), the process proceeds to exit, if No (capacitor voltage>Voltage b), the process proceeds to step S13. Here, the "the deterioration free voltage b representing the voltage at which deterioration does not proceed" is set to the same voltage value as the step S4.

In step S13, subsequent to the determination in step S12 or S14 that the capacitor voltage>voltage b, the forced discharge switch 48 is closed to forcibly discharge the capacitor 23 using the current 3 representative of the normal discharge current, and control proceeds to step S14.

In step S14, subsequent to the forced discharge at discharge current 3 in step S13, it is determined whether or not the capacitor voltage is equal to the deterioration free voltage b or less. If YES (capacitor voltage≤voltage b), the process proceeds to exit. If No (capacitor voltage>Voltage b), the process returns to step S13.

Here, the "deterioration free voltage b, i.e., the voltage at which deterioration does not proceed" is set to the same voltage value as the step S4.

Now, a description is given of the operation.

The operation in the control unit of the FF plug-in hybrid vehicle of the first embodiment, description is given in Characteristic Operation by Capacitor Power Supply Circuit Configuration, Charge and Discharge Operation of Capacitor Power Supply, Capacitor Charge and Discharge Control Operation During Ignition ON, and Capacitor Charge and Discharge Control Operation During Ignition OFF, separately.

Characteristic Operation by Capacitor Power Supply Circuit Configuration

For example, in the idle stop vehicles, in the case where the power supply of the starter motor is set to a 12V battery, the power supply circuitry will be configured to be the capacitor power supply circuit configuration of the first embodiment with the DLC unit 45 and the fuse 40 excluded, which is now referred to as Comparative Example.

In this Comparative Example, a single 12V battery is commonly shared by the starter motor and the power source of the vehicle auxiliary equipment. Thus, when the power requirements is high for the vehicle auxiliary equipment, in response to an engine start-up by the starter motor, due to shortage of supply power, at the instant of the engine starting, an instantaneous voltage drop occurs with which the voltage of the vehicle auxiliary equipment abruptly falls.

In contrast, in the first embodiment, the auxiliary load power supply system 39 is configured by connecting the high voltage battery 21 and the 12V battery 22 via the DC/DC converter 37. The DLC unit 45 is configured to include the capacitor charging circuit 41 that is connected by branching from the DC/DC converter 37, and the capacitor connected to the capacitor charging circuit 41. Further, the capacitor power supply circuit is configured by a semiconductor relay 51 as a switch incorporated in the capacity charge circuit 41 between the auxiliary load power supply system 39 and the DLC unit 45.

Through this configuration, while charging the 12V battery 22 and the capacitor 23 by the power from the high voltage battery 21, the 12V battery 22 supplies the necessary power to the 12V system load 36 of the vehicle auxiliary equipment, and the capacitor 23 supplies the necessary power to the starter motor 1. That is, the power supply is not shared between the starter motor 1 and the 12V system load 36. Further, the two power supplies, i.e. the 12V battery 22 and the capacitor 23 are subjected to charge back up by the high voltage battery 21.

Further, without modifying the power supply circuit configuration of the idle stop vehicle of Comparative Example, by adding the DLC unit 45 (capacitor charging circuit 41+capacitor 23), the capacitor power supply circuit may be configured. Thus, since the DLC unit 45 may be added in a similar manner as addition of the auxiliary equipment, it is not necessary for the control of the high voltage battery 21 and the DC/DC converter 37 to be modified from the control of Comparative Example.

Furthermore, when the charge and discharge balance of the auxiliary load power supply system 39 is likely to collapse, the DLC unit 45 (capacitor charging circuit 41+capacitor 23) is capable of controlling the charging current, and may be separated from the auxiliary load power supply system 39 by the semiconductor relay 51 representing a switch. Therefore, by keeping open the semiconductor relay 51 at the time of starter start-up, it is possible to prevent the voltage of the vehicle auxiliary equipment from being decreased suddenly. In addition, there is no need to change the converter capacity of the DC/DC converter 37 and the battery capacity of the 12V battery 22 from the converter capacity and battery capacity set in Comparative Example.

Charge and Discharge Operation of Capacitor Power Supply

With respect to the capacitor power supply circuit, a description is given of "Engine start control operation by the starter motor 1", "Charge control operation to the capacitor 23", and "Discharge control operation from the capacitor 23" respectively performed by the hybrid control module 81.

At the time of an engine start-up by the starter motor 1, in response to the output of the starter start-up command from the hybrid control module 81, when the HEV/IS/Relay 60 is energized, the relay switch 44 is turned on to shift the pinion 57 to a position where the pinion 57 engages with the ring gear 58. Thus, the starter start-up is performed by the starter motor 1 powered by the capacitor 23 to rotate the crankshaft of the transverse engine 2, and the HEV/IS/relay 60 is shut off after a predetermined time has elapsed of the energization. Incidentally, the starter cut-off relay 59, except when the vehicle condition for prohibiting engine start is satisfied, energization is maintained by the body control module 87. Also, the starter relay 61 built in the under-hood switching module 88 is energized only during the selection of the P range. A cut-off state is maintained at the time of selection of the D range and the like other than the P range.

Accordingly, during the engine start-up control by the starter motor 1, as a rule, while the HEV/IS/relay 60 is energized by the starter start command in the starter start-up permission conditions, the starter motor 1 is driven by using the electric power of the capacitor 23 to start up the transverse engine 2.

At the time of charging to the capacitor 23, based on the output of the charge command from the hybrid control module 81, the semiconductor relay 51 of the capacitor charging circuit 41 is closed, and a capacitor charging current is selected. Thus, by introducing the power from the high voltage battery 21 into the capacitor 23 via the DC/DC converter 37, fuse 40, semiconductor relay 51, DC/DC converter 52, a short time charging takes place in accordance with the capacitor charge current. Note that the capacitor charge current is set to current 1 (for example, 15 A) as a base current. Exceptionally, the current 2 (for example, 20 A) is selectable in place of the current 1. Therefore, the charge control of the capacitor 23, while the charge command is output, using the power from the high voltage battery 21, the capacitor 23 is charged with the capacitor charging current selected.

At the time of discharge from the capacitor 23, based on the output of the natural discharge command from the hybrid control module 81, the self-discharge switch 47 of the DLC unit 45 is closed to perform self-discharge from the capacitor 23. Also, based on the output of the forced discharge command from the hybrid control module 81, by closing the forced discharge switch 48 of the DLC unit 45, the forced discharge is carried out from the capacitor 23. In the case of the forced discharge, the discharge amount per unit time is set larger than that of the natural discharge.

Thus, at the time of the forced discharge control of the capacitor 23, while the forced discharge switch 48 is closed on the basis of the forced discharge command, the electric power of the capacitor 23 is converted to the resistance heat, and discharge is performed in a shorter time than the natural discharge. As the capacitor discharge current, the current 3 is set to the basic current. As an exception, the current 4 is provided greater than the current 3.

Thus, at the time of the forced discharge control of the capacitor 23, while the discharge command is being output, the high voltage battery 21 is discharged at the selected capacitor discharge current.

Capacitor Charge and Discharge Control Operation During Ignition ON

As described above, the FF plug-in hybrid vehicle that allows external charging is intended to run at a high electricity efficiency, and the running mode selection control is performed based on the battery SOC of the high voltage battery 21. In this running mode selection control, during a period in which the battery SOC of the high voltage battery 21 is being reduced from full SOC to a preset SOC (=threshold value), as a rule, a priority is placed on the EV running and the "CD mode" is selected for consuming power of the high voltage battery 21. Further, upon the battery SOC of the high voltage battery 21 being equal to a present SOC (=threshold value) or lower, as a rule, the "CS mode" is selected in which the HEV running will be prioritized.

Further, the startup of the transverse engine 2 while the "CD mode" is being selected is basically performed by a start-up by the starter motor 1 (starter start-up). On the other hand, with respect to the start-up of the transverse engine 2 while the "CS mode" is being selected, start-up by the motor/generator 24 is basically performed.

Therefore, by using the running mode selection control information, which is characteristic of the plug-in hybrid vehicle, in the capacitor charge and discharge control of the first embodiment, the capacitor charge amount (=capacitor voltage) is managed during the ignition-on time and the ignition off time.

That is, while the "CD mode" with the basics of starter start-up is selected, without waiting for the capacitor charging time, in order to enable the starter start-up in response to the starter start-up command, it is necessary to elevate the capacitor voltage in advance. In contrast, while the "CS mode" with the basis of the M/G start-up is selected, there is no need to elevate the capacitor voltage in the preparation of the starter start-up. In addition, since the capacitor increases the internal resistance and deterioration will be accelerated with a full charge state, if not used, it is preferable to discharge the capacitor to the deterioration free voltage for extending the life.

Therefore, when the ignition ON, it is set as the management indicator of the capacitor charging state whether the running mode being selected is "CS mode" or "CD mode". While the "CD mode" is selected, the starter start-up is given priority. While the "CS mode" is selected, prevention of the capacitor deterioration is given priority. Below, with reference with FIG. 4, the charge and discharge control operation of the capacitor is described when the ignition ON, which reflects that strategy.

First, when the ignition ON, When the "CD mode" is selected and the capacitor voltage is less than the starter start-up enabling voltage a, in the flowchart of FIG. 4, control repeats the flow from step S1→step S2→step S3→step S7. That is, based on the determination that the capacitor voltage in step S2 is less than the starter startup enabling voltage a, the capacitor recharging is performed at step S3. When the capacitor voltage at the step S2 is determined to be equal to a starter start-up enabling voltage a or more, the control proceeds to repeat the flow; step S1→step S2→step S7. That is, when the ignition is ON with the "CD mode" selected, the capacitor voltage is maintained above the starter start-up enabling voltage a.

On the other hand, when the ignition ON and transition from "CD mode" to the "CS mode" takes place, since the capacitor voltage exceeds the deterioration free voltage b at which deterioration does not proceed, in the flowchart of FIG. 4, control proceeds the flow of step S1→step S4→step S5→step S6. And, while it is determined that the capacitor voltage>voltage b in step S6, control repeats the flow, step S5→step S6, and the capacitor forced discharge is performed. Then, due to the forced discharge, when the capacitor voltage is equal to or less than voltage b, control proceeds from step S6 to step S7. As long as the relationship that capacitor voltage≥voltage b is maintained, the flow proceeds to repeat the flow step S1→step S4→step S7. That is, when the ignition ON with the "CS mode" selected, the capacitor voltage is maintained at the voltage b at which degradation does not proceed.

As described above, in the first embodiment, when the ignition is ON and the "CD mode" is selected, the capacitor voltage is maintained at the starter start-up permission voltage or more. Further, when the ignition is ON and the "CS mode" is selected, the capacitor voltage is configured to be equal to or below the deterioration free voltage b at which deterioration does not proceed (steps S1 to S7 in FIG. 4). In other words, when the "CD mode" is selected, the capacitor voltage (starter start-up permission voltage a or more) is maintained to which priority to the starter start-up is given. When the "CS mode" is selected, the capacitor voltage (deterioration free voltage at which no deterioration proceeds) is maintained to which priority to the capacitor deterioration prevention.

Consequently, when the ignition is ON, while ensuring the starter start-up, it is possible to achieve the suppression of deterioration of the capacitor 23.

In the first embodiment, when the ignition is ON and the "CD mode" transitions to the "CS mode", it is necessary to decrease the capacitor voltage from the starter start-up permission voltage a to the deterioration free voltage b at which deterioration does not proceed. Thus, it will take a long time until the capacitor voltage is lowered by natural discharge.

In contrast, along with the transition from the "CD mode" to the "CS mode", when decreasing the capacitor voltage from the starter start-up permission voltage a and more to the deterioration free voltage b or lower, due to forced discharge to facilitate the decrease to the deterioration free voltage b or less, it is possible to suppress the progress of the capacitor deteriorate.

Capacitor Charge and Discharge Control Operation During Ignition OFF

First, in general, when an ignition-off time becomes longer as compared with the ignition ON time, and the capacitor voltage is kept increased during the ignition OFF, the capacitor deterioration proceeds. Therefore, when the ignition is turned off, regardless of the running mode being selected, priority is given to prevention of capacitor deterioration. Below, with reference to FIG. 4, a description is given of the capacitor charge and discharge control operation reflecting this strategy during ignition OFF.

First, in the flowchart of FIG. 4, when the ignition switch 91 is switched from ON to OFF, the process proceeds from step S7 to step S8, the capacitor voltage condition at the ignition ON is maintained until a predetermined time α has elapsed. When the predetermined time period a has elapsed, while the selection mode is in the "CD mode" and the capacitor voltage exceeds the deterioration free voltage b, process repeats the flow of step S9→step S10→step S11. Further, in step S11, the forced discharge using the current 4 higher than the normal current 3 is performed. When the capacitor voltage decreases to the deterioration free voltage b or below, control proceeds from step S10 to END. In other words, while the ignition is OFF with the "CD mode" being selected, the forced discharge takes place in short time using the current 4.

On the other hand, at elapse of the predetermined time α, when the selected mode is in the "CS mode" and the capacitor voltage is at the deterioration free voltage b or below, control proceeds from step S9 to END via step S12 in the flowchart of FIG. 4. Further, when the capacitor voltage exceeds the deterioration free voltage b, control proceeds the flow, step S9→step S12→step S13→step S14, and the flow proceeding to steps S13, 14 will be repeated until the deterioration free voltage b or below is achieved. Further, in step S13, a forced discharge is carried out using the normal current 3, and upon the capacitor voltage falling to the deterioration free voltage or below, control proceeds from step S14 to END. In other words, when the ignition is Off with the "CS mode" being selected, the forced discharge is carried out using current 3.

As described, in the first embodiment, after the ignition is turned OFF, when the predetermined time α has elapsed, regardless of modes, i.e., "CD mode" or "CS mode", the capacitor voltage of the capacitor 23 is configured to be decreased to the voltage b or below, at which deterioration does not proceed (steps S8 to step S14 in FIG. 4). That is, when switching the ignition switch 91 from ON to OFF, it is necessary to decrease the capacitor voltage from capacitor voltage availing at this time to the deterioration free voltage b or below. Thus, it takes a long time for waiting for decrease in the capacitor voltage caused by the natural discharge.

In contrast, along with the ignition off operation, when reducing the capacitor voltage to a voltage b or less at which deterioration does not proceed, a forced discharge is employed. Thus, by decreasing the capacitor voltage quickly to the capacitor voltage at which deterioration does not proceed, it is possible to suppress the progress of the capacitor deteriorate.

In the first embodiment, at the time of the "CD mode", a configuration is adopted in which deterioration does not proceed due to forced discharge with current 2 higher than the normal current 1 (step S11 in FIG. 4).

That is, when switching on to off with the "CD mode" maintained, it is necessary for the capacity voltage to be significantly reduced from the starter start-up permission voltage a or more to the deterioration progress free voltage b or less.

In contrast, by using the forced discharge with current 4 higher than the normal current 3, it is possible to decrease the capacitor voltage earlier to a voltage b at which degradation does not proceed.

In the first embodiment, at the time of the "CS mode", such a configuration is adopted in which the capacitor voltage is reduced to the deterioration free voltage b or less by the forced discharge using the normal current 3 (step S13 in FIG. 4). In other words, it is basically not required to reduce the capacitor voltage when turning the ignition switch 91 from ON to OFF with the "CS mode" maintained. Only when the capacitor voltage is higher than the deterioration free voltage, the excess portion is required to be reduced. In contrast, due to the forced discharge using the normal current 3, it is possible to decrease the capacitor voltage to the deterioration free voltage b or less while suppressing the thermal load.

In the first embodiment, the predetermined time period a between ignition off and the start of the forced discharge of the capacitor 23 is set to a standby time considering the case of switching to ignition ON from Ignition OFF due to change-mind of the driver (step S8 in FIG. 4).

For example, due to the parking position change in a parking lot, the driver may, immediately after stop in a position with the ignition off, switch the ignition ON to travel to a slightly distant place for renewed parking operation. In such cases, it is necessary to maintain a state capable of starting the starter.

Therefore, after the ignition is turned off, by waiting for a predetermined time α until the start of the forced discharge of the capacitor 23, even when the ignition switch is switched from off to on position, the capacitor voltage may be maintained at the starter start-up permission voltage a or more.

Now, a description is given of the effect.

In the control system of the FF plug-in hybrid vehicle in the first embodiment, it is possible to obtain the following effects.

(1) A control system for a plug-in hybrid vehicle (FF plug-in hybrid vehicle) having a drive system including a starter motor 1, an engine (transverse engine 2), and a motor/generator 4, and a power supply system including a high voltage battery 21 representing a power supply source of the motor/generator 4, a capacitor representing a power supply source of the starter motor 1, and a capacitor charge and discharge control unit (hybrid control module 81) that controls charge and discharge of the capacitor 23, the control system comprising:

an engine start control unit (hybrid control module 81) that cranks the engine (transverse engine 2) for start-up using the starter motor 1 powered by the capacitor 23, and a running mode selection unit (hybrid control module 81) that basically selects a CD mode in which an EV running is performed by consuming power of the high voltage battery 21 when the charge capacity (battery SOC) of the high voltage battery 21 is equal to a threshold value or more and that basically selects a CS mode in which a HEV running is performed by maintaining the charge capacity (battery SOC) of the high voltage battery 21 when the charge capacity (battery SOC) of the high voltage battery 21 is less than the threshold value, wherein the capacity charge and discharge control unit (hybrid control module 81) is configured such that, at the time of ignition on with the CD mode being selected, the capacitor voltage is maintained at a starter start-up permission voltage a or more, and, when the CS mode is selected, the capacitor voltage is maintained at a deterioration free voltage b or less at which no deterioration proceeds (FIG. 4).

Thus, at the time of ignition on, while securing the starter start-up, deterioration in the capacitor 23 may be suppressed from proceeding.

(2) The capacitor charge and discharge control unit (hybrid control module 81) is configured to reduce the capacitor voltage of the capacitor 23 by a forced discharge to the deterioration free voltage b or less when the CD mode transitions to the CS mode at the time of ignition ON.

Thus, in addition to the effect of (1), when transition takes place from the "CD mode" to the "CS mode", it is possible to reduce quickly the capacitor voltage to the deterioration free voltage b or less to thereby suppress the progress of the capacitor deterioration.

(3) The capacitor charge and discharge control unit (hybrid control module 81), after ignition is turned off and elapse of a predetermined time α, regardless of whether the CS mode or the CD mode is in place, the capacitor voltage of the capacitor 23 is configured to be reduced to the deterioration free voltage b or below (FIG. 4). Therefore, in addition to the effects of (1) and (2), upon ignition being turned off, by reducing the capacitor voltage quickly to a voltage b at which degradation does not proceed, it is possible to suppress the progress of the capacitor deteriorate.

(4) The capacitor charge and discharge control unit (hybrid control module 81) is configured to perform, at the time of the CD mode, the forced discharge using a fourth discharge current (current 4) higher than a normal, third discharge current (current 3) to bring the capacitor voltage to the deterioration free voltage or less, at which deterioration does not proceed (FIG. 4).

Thus, in addition to the effect of (3), it is possible to rapidly reduce the capacitor voltage, to the deterioration free voltage b at which deterioration does not proceed.

(5) The capacitor charge and discharge control unit (hybrid control module 81) is configured to perform, at the time of the CS mode, the forced discharge using a normal, third discharge current (current 3) to bring the capacitor voltage to the deterioration free voltage or less (FIG. 4), at which deterioration does not proceed.

Therefore, in addition to the effect of (3) or (4), the capacitor voltage may be reduced to a voltage b or below at which deterioration does not proceed, while suppressing the thermal load.

(6) The capacitor charge and discharge control unit (hybrid control module 81) is configured to set a predetermined time α after the ignition is turned off until the start of the forced discharge of the capacitor 23 to a standby time considering a case in which the ignition switch is turned on from the ignition being turned off due to change-mind of the driver (FIG. 4). Therefore, in addition to the effects of (3) to (5), even when the ignition switch is switched to ignition ON from ignition OFF by change-mind of the driver, the capacitor voltage can be ensured at the voltage at the time of the ignition ON.

As described above, the control system of a plug-in hybrid vehicle has been described based on the first embodiment. With respect to the specific configurations, however, the present invention is not limited thereto. Rather, according to the claims in the appended claims, without departing from the gist of the invention, design changes and additions are acceptable.

In the first embodiment, such an example is shown in which, as the capacitor charge and discharge control unit, at the time of ignition ON with the CD mode being selected, the capacitor voltage is maintained at the starter start-up permission voltage a or more, while, with the CS mode being selected, the capacitor voltage is maintained at the deterioration free voltage b or less. However, the capacitor charge and discharge control unit may be configured, at the time of ignition ON with the CD mode being selected, to maintain full charge of the capacitor. Further, at the time of ignition ON with the CS mode being selected, the capacitor voltage may be maintained to 0 V.

In the first embodiment, an example is shown, in which, as the capacitor charge and discharge control unit, control of recharge and forced discharge are performed using the running mode information and the capacitor voltage information. However, as the charge and discharge control unit, another example for controlling the recharging and forced discharge may be available by using capacitance information instead of the capacitor voltage information. In other words, when assuming the charge Q, the electrostatic capacity or capacitance C, and the capacitor voltage V, the charge Q is represented by Q=C·V. Thus, when the capacitance C is constant, the charge Q is proportional to the capacitor voltage V. Therefore, by using the charge information instead of the capacitor voltage information, the equivalent controlling may be achieved.

In the first embodiment, an example is shown for using the hybrid control module 81 as the capacitor charge and discharge control unit. However, as the capacitor charge and discharge control unit, a power supply system controller provided independently may be used. Alternatively, a power supply system capacitor charge and discharge control section may be provided in a controller other than the hybrid control module.

In the first embodiment, an example is shown in which the control system according to the present invention is applied to the FF plug-in hybrid vehicle. However, the control system according to the present invention is not limited to the FF plug-in hybrid vehicle, and can also be applied to a FR plug-in hybrid vehicle or a plug-in hybrid 4WD vehicle. In short, the present invention may be applied to a plug-in hybrid vehicle with a capacitor as starting power supply, in which an external charging is available to a high voltage battery.

The invention claimed is:

1. A control system for a plug-in hybrid vehicle having a drive system including a starter motor, an engine, and a motor/generator, and a power supply system including a high voltage battery representing a power supply of the motor/generator, a capacitor representing a power supply of the starter motor, and a capacitor charge and discharge control unit that controls charge and discharge of the capacitor, the control system comprising:

an engine start control unit configured to crank the engine for start-up using the starter motor powered by the capacitor; and a running mode selection controller configured to select a charge depleting (CD) mode in which electrical vehicle (EV) running is performed by consuming power of the high voltage battery when a charge capacity of the high voltage battery is greater than or equal to a threshold value and to select a charge sustain (CS) mode in which hybrid vehicle (HEV) running is performed by maintaining the charge capacity of the high voltage battery when the charge capacity of the high voltage battery is less than the threshold value, the capacitor charge and discharge control unit being configured such that, at a time of ignition on with the CD mode being selected, a capacitor voltage is maintained at or above a starter start-up permission voltage, and, when the CS mode is selected, the capacitor voltage is maintained at or below a deterioration-free voltage at which deterioration does not proceed.

2. The control system for a plug-in hybrid vehicle as claimed in claim 1, wherein
the capacitor charge and discharge control unit is configured to reduce the capacitor voltage of the capacitor by a forced discharge to a voltage less than or equal to the deterioration-free voltage when the CD mode transitions to the CS mode at the time of ignition ON.

3. The control system for a plug-in hybrid vehicle as claimed in claim 1, wherein
the capacitor charge and discharge control unit is configured such that, after ignition is turned off and a predetermined time has elapsed, regardless of whether the CS mode or the CD mode is in place, the capacitor voltage of the capacitor is reduced to a voltage less than or equal to the deterioration-free voltage.

4. The control system for a plug-in hybrid vehicle as claimed in claim 3, wherein
the capacitor charge and discharge control unit is configured to perform, when the CD mode is being selected at the time at which the predetermined time has elapsed after the ignition is turned off, the forced discharge using a fourth discharge current higher than a normal, third discharge current to bring the capacitor voltage to a voltage less than or equal to the deterioration-free voltage, at which deterioration does not proceed.

5. The control system for a plug-in hybrid vehicle as claimed in claim 3, wherein
the capacitor charge and discharge control unit is configured to perform, when the CS mode is being selected at the time at which a predetermined time has elapsed after the ignition off, the forced discharge using a normal, third discharge current to bring the capacitor voltage to a voltage less than or equal to the deterioration-free voltage, at which deterioration does not proceed.

6. The control system for a plug-in hybrid vehicle as claimed in claim 3, wherein
the capacitor charge and discharge control unit is configured to set the predetermined time after the ignition is turned off until the start of the forced discharge of the capacitor to a standby time considering a case in which the ignition switch is turned on from the ignition being turned off due to change-mind of the driver.

7. The control system for a plug-in hybrid vehicle as claimed in claim 2, wherein
the capacitor charge and discharge control unit is configured such that, after ignition is turned off and a predetermined time has elapsed, regardless of whether the CS mode or the CD mode is in place, the capacitor voltage of the capacitor is reduced to a voltage less than or equal to the deterioration-free voltage.

8. The control system for a plug-in hybrid vehicle as claimed in claim 4, wherein
the capacitor charge and discharge control unit is configured to perform, when the CS mode is being selected at the time at which the predetermined time has elapsed after the ignition is turned off, the forced discharge using a normal, third discharge current to bring the capacitor voltage to a voltage less than or equal to the deterioration-free voltage, at which deterioration does not proceed.

9. The control system for a plug-in hybrid vehicle as claimed in claim 4, wherein
the capacitor charge and discharge control unit is configured to set the predetermined time after the ignition is turned off until the start of the forced discharge of the capacitor to a standby time considering a case in which the ignition switch is turned on from the ignition being turned off due to change-mind of the driver.

10. The control system for a plug-in hybrid vehicle as claimed in claim 5, wherein
the capacitor charge and discharge control unit is configured to set the predetermined time after the ignition is turned off until the start of the forced discharge of the capacitor to a standby time considering a case in which the ignition switch is turned on from the ignition being turned off due to change-mind of the driver.

* * * * *